United States Patent
Taddei et al.

(10) Patent No.: US 10,503,182 B2
(45) Date of Patent: Dec. 10, 2019

(54) APPARATUS AND METHOD FOR METALS FREE REDUCTION AND CONTROL OF RESISTIVITY OF DEIONIZED WATER

(71) Applicant: VEECO PRECISION SURFACE PROCESSING LLC, Horsham, PA (US)

(72) Inventors: John Taddei, Jim Thorpe, PA (US); Jonathan Yutkowitz, Horsham, PA (US)

(73) Assignee: VEECO PRECISION SURFACE PROCESSING LLC, Horsham, PA (US)

( * ) Notice: Subject to any disclaimer, the term of this patent is extended or adjusted under 35 U.S.C. 154(b) by 485 days.

(21) Appl. No.: 14/884,603

(22) Filed: Oct. 15, 2015

(65) Prior Publication Data

US 2016/0139610 A1 May 19, 2016

Related U.S. Application Data

(60) Provisional application No. 62/081,775, filed on Nov. 19, 2014.

(51) Int. Cl.
| | |
|---|---|
| *G05D 21/02* | (2006.01) |
| *C02F 1/68* | (2006.01) |
| *B01F 15/00* | (2006.01) |
| *B01F 15/04* | (2006.01) |
| *B01F 3/04* | (2006.01) |
| *C02F 103/04* | (2006.01) |

(52) U.S. Cl.
CPC .......... *G05D 21/02* (2013.01); *B01F 3/04106* (2013.01); *B01F 15/00227* (2013.01); *B01F 15/0408* (2013.01); *C02F 1/685* (2013.01); *C02F 2103/04* (2013.01)

(58) Field of Classification Search
None
See application file for complete search history.

(56) References Cited

U.S. PATENT DOCUMENTS

| | | | | |
|---|---|---|---|---|
| 4,096,028 | A * | 6/1978 | Rosenberger | D21C 9/02 162/252 |
| 4,778,532 | A * | 10/1988 | McConnell | B05C 3/109 134/10 |
| 6,158,721 | A | 12/2000 | Katou et al. | |
| 7,329,312 | B2 | 2/2008 | Morita et al. | |
| 7,533,873 | B2 | 5/2009 | Nagasaka et al. | |
| 8,727,323 | B2 | 5/2014 | Siewart et al. | |
| 2002/0179508 | A1 * | 12/2002 | Nachtman | C02F 9/005 210/136 |
| 2009/0139541 | A1 | 6/2009 | Ozawa et al. | |
| 2011/0062070 | A1 * | 3/2011 | Martini | C02F 1/006 210/196 |
| 2012/0091049 | A1 * | 4/2012 | West | G01F 1/684 210/149 |

\* cited by examiner

*Primary Examiner* — Richard C Gurtowski
(74) *Attorney, Agent, or Firm* — Leason Ellis LLP

(57) ABSTRACT

An apparatus and method to convert high resistivity (18 MOhm/cm) deionized water into lower resistivity deionized water with a tight resistivity range (150 KOhm/cm+\-50 KOhm/cm) without adding metals to the DI. The invention discreetly injects carbon dioxide in an on demand fashion through a metals free fluid path.

24 Claims, 2 Drawing Sheets

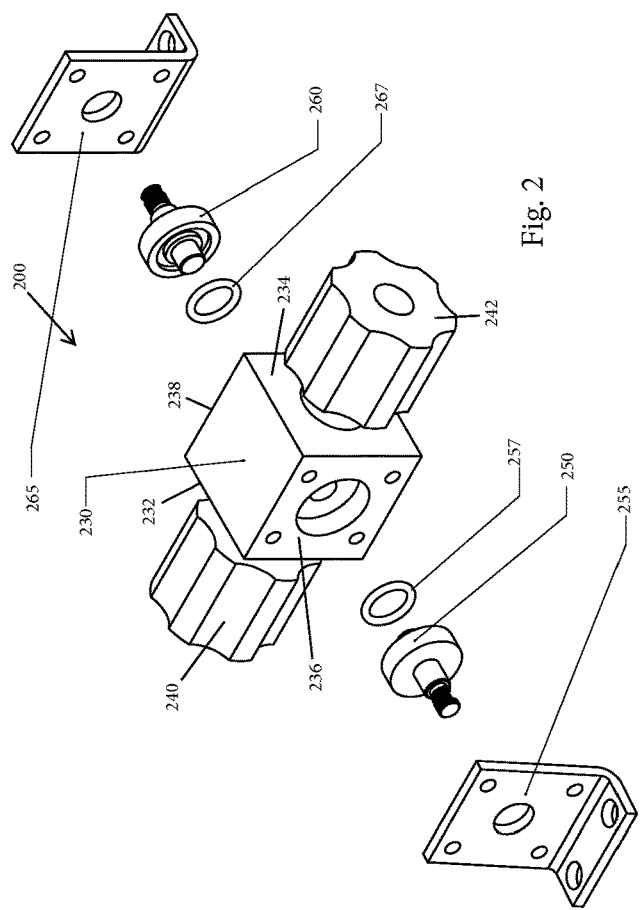
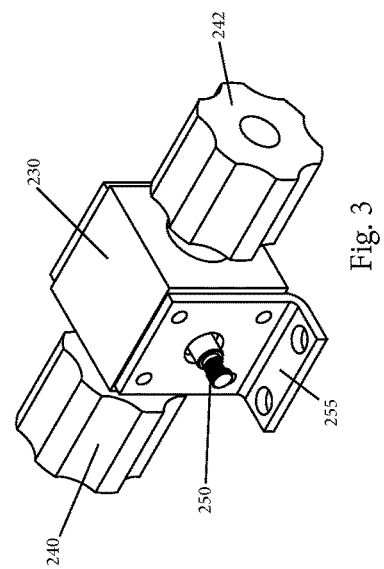
Fig. 2
Fig. 3
RESISTIVITY SENSOR
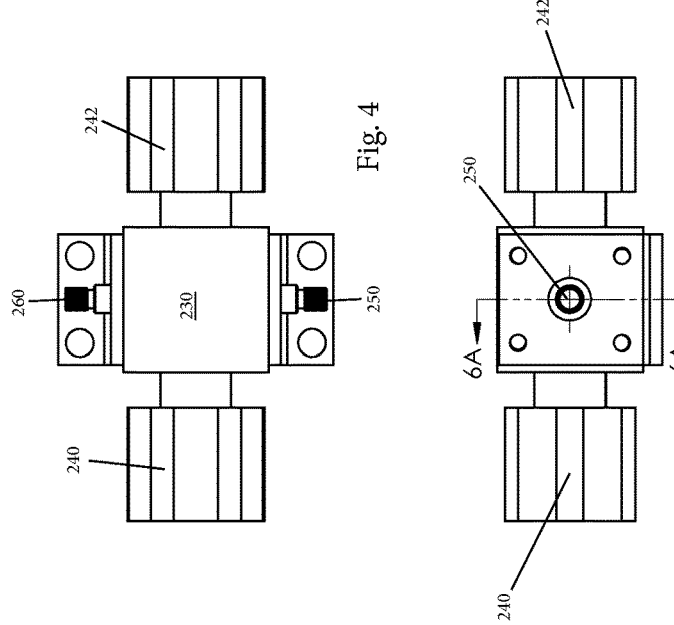
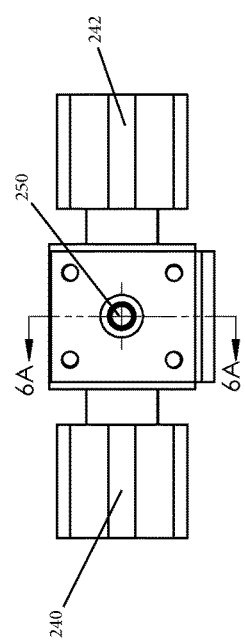
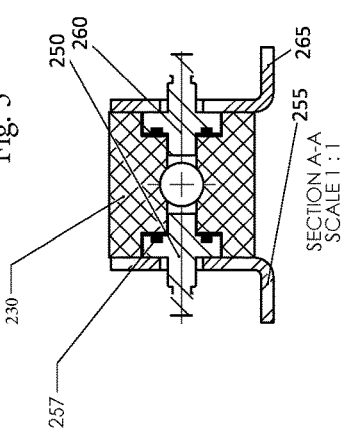
Fig. 4
Fig. 5
SECTION A-A
SCALE 1:1
Fig. 6

APPARATUS AND METHOD FOR METALS FREE REDUCTION AND CONTROL OF RESISTIVITY OF DEIONIZED WATER

CROSS-REFERENCE TO RELATED APPLICATION

The present application claims the benefit of U.S. patent application Ser. No. 62/081,775, filed Nov. 19, 2014, which is hereby incorporated by reference in its entirety.

TECHNICAL FIELD

This invention generally relates to an apparatus and method for reducing and controlling resistivity of a fluid, such as deionized water (DI water). More specifically, this invention relates to an improved apparatus and method for injecting controlled volumes of carbon dioxide into deionized water without the addition of metals into the DI water.

BACKGROUND

Semiconductor manufacturing has historically used 18 MOhm/cm deionized water as a rinsing and cleaning fluid. Semiconductor manufacturers put water through a sequence of steps to remove particles and metal ions that would otherwise poison semiconductor devices. Once these impurities are removed from water the resistivity is typically raised to 18 MOhm/cm. DI water in many cases is used as a pressurized medium to remove particles from the surfaces of wafers. These particles would otherwise cause defects in the semiconductor devices on the wafers. The undesired side effect of pressurized dispense of deionized water on wafers is the build of static voltages and eventually electrostatic discharge (ESD). Many semiconductor devices are ESD sensitive and if voltages are permitted to build and then discharge, yield loss will occur.

The static voltages are created when a non conductive fluid (such as 18 MOhm/cm DI) aggressively contacts a non-conductive (or electrically isolated) surface (such as a wafer). The voltage built will be proportional to the aggressiveness (force) of the dispense and proportional to the resistivity of the fluid employed. The cleaning efficiency of the water dispense is also proportional to the force of the spray. This leads to the paradox of high pressure spray being required to remove particles from the wafer surface to increase yield, but high pressure spray causing static voltage to build to the point of discharge causing yield loss.

The industry has used carbon dioxide to lower the resistivity of the DI water. Systems currently used metal components such as 316SS (stainless steel) tanks, piping and fittings in the DI water:CO2 mixing system. These systems were successful at reducing the resistivity levels of the DI water but the metal components in the plumbing path added metal ions into the DI water. These metal ions could re-deposit on semiconductor devices and interfere with their operation.

There is therefore a need to provide a solution to this problem.

SUMMARY

In one embodiment, an apparatus is provided for discreetly (selectively) injecting carbon dioxide in 18 MOhm/cm DI to create 150 KOhm/cm DI water within a tight tolerance in an on demand, metals free fashion. The apparatus consists of a pressure vessel with an 18 MOhm/cm DI water inlet port and a 150 KOhm/cm DI water exit port. There is another inlet port for pressurized carbon dioxide and a port for nitrogen inlet and a pressure transducer. There is an external tank level sensor and resistivity probe.

DI water is supplied to vessel until the tank is at target level. Software controls tank pressure by supplying nitrogen to the top of the tank. The pressure is monitored via pressure transducer feedback. The resistivity of the DI water in the tank will be monitored by the continuous withdrawal of a small sample volume (of the DI water) for the resistivity probe. When the measured resistivity is above a selected set point (target value), carbon dioxide flows into the vessel. Carbon dioxide enters from the bottom of the tank and bubbles through the DI water. As the bubbles flow upward the carbon dioxide dissolves into solution and lowers resistivity. When resistivity is below the set point, the carbon dioxide flow is stopped.

The apparatus works in an on demand fashion permitting a smaller vessel and optimized plumbing package to be used and therefore requires less space. There are no exposed metals in the fluid path so that the Di water exits the apparatus at reduced resistivity without the unwanted addition of metals to the DI water.

BRIEF DESCRIPTION OF THE DRAWING FIGURES

FIG. 2 is an exploded perspective view of a resistivity sensor that is part of the system of FIG. 1;

FIG. 3 is a perspective view of the resistivity sensor in an assembled state;

FIG. 4 is a top plan view of the resistivity sensor;

FIG. 5 is a side elevation view of the resistivity sensor; and

FIG. 6 is a cross-sectional view through the line 6-6 of FIG. 5.

DETAILED DESCRIPTION OF CERTAIN EMBODIMENTS

Figure 1:
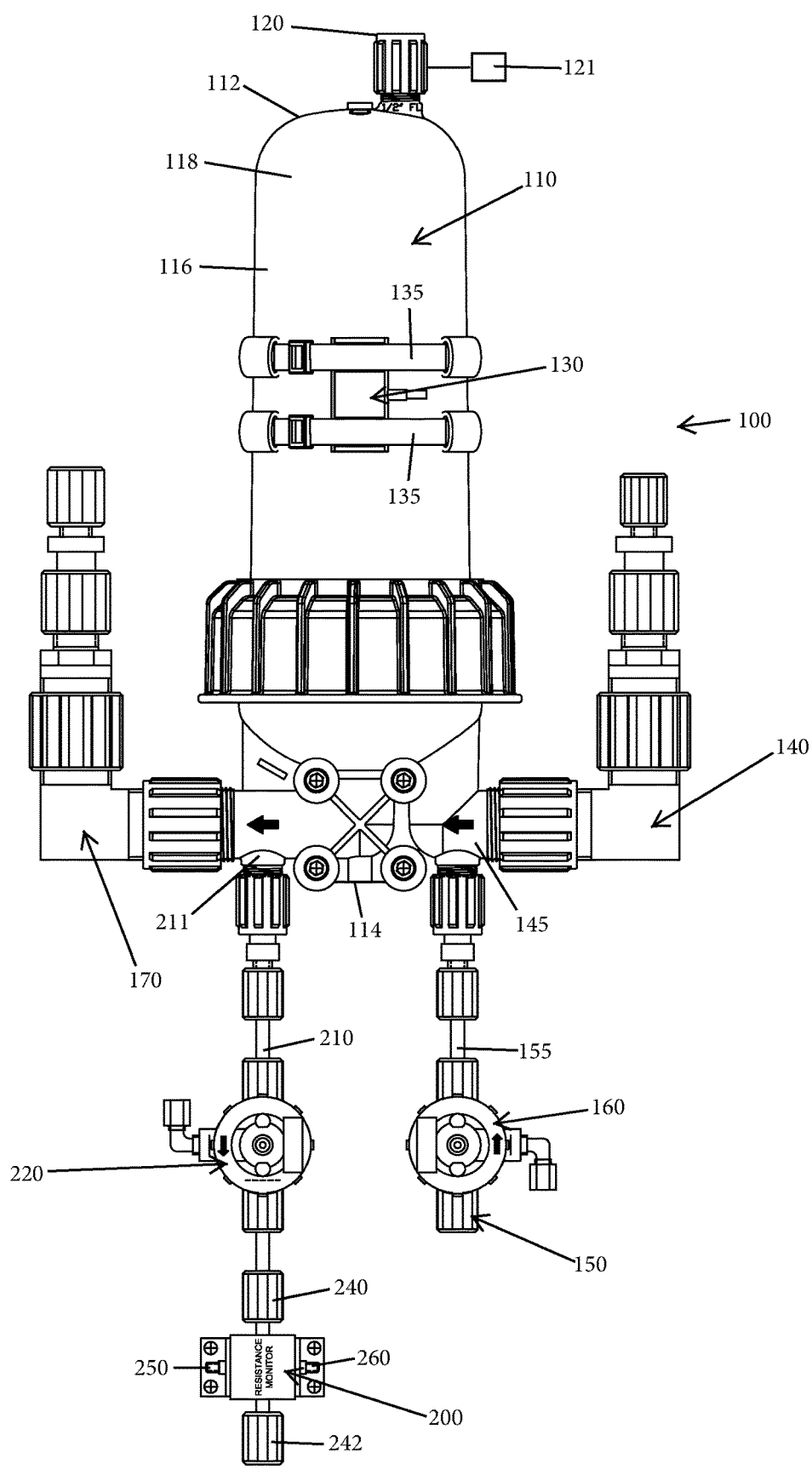
FIG. 1 is a side elevation view of a system configured to convert high resistivity deionized water into lower resistivity deionized water in accordance with one embodiment of the present invention.

Now referring to FIGS. 1-6, an apparatus 100 is provided for reducing the resistivity of a fluid in a manner in which metal ions are not added to the fluid during the treatment of the fluid as a result of the fluid flowing within a fluid circuit that is made of metal free materials.

In one exemplary embodiment, the present applicant has responded to industry demands by developing an improved DI water:$CO_2$ mixing device 100. The device 100 creates low resistivity (150 KOhm/cm+\−50 KOhm/cm) deionized water on demand with no metals components in the wetted fluid path so the Di exits this system without the addition of metals into the DI. This overcomes the concerns associated with the prior art as previously mentioned.

It will be appreciated that while the fluid introduced into the device 100 can be water, it can also be other fluids and in particular, the fluid can be any fluid that is not compatible with a traditional metallic system (due to metal ions being added to the fluid and adversely impacting the resistivity thereof).

The device 100 can be thought of as being part of an overall DI water circuit which includes a source of DI water (not shown) and a piece of downstream equipment (not shown) such as a sprayer which disperses the DI water over a target surface (such as a wafer). It will be appreciated that the device 100 can be used in other applications as well in which there is a need for low resistivity DI water (or other fluid).

The device 100 includes a storage vessel 110 that has a first (top) end 112 and an opposing second (bottom) end 114. The vessel 110 also has a side wall 116 that defines an outer surface 118. The vessel 110 can take any number of different shapes including a cylindrical shape as shown. In the illustrated embodiment, the vessel 110 is in the form of a tank or the like. In view of the present objective, the vessel 110 is formed of a non-metal material and in particular, is formed of plastic or other suitable material.

At the bottom end 114, the vessel 110 also includes a first inlet 140 for delivering a first fluid into the hollow interior of the vessel 110. The first inlet 140 can include any number of connectors and/or valve structures to selectively allow for introduction of the second fluid into the hollow interior of the vessel 110. For example, the first inlet 140 can be configured to receive a first fluid, in this case, the DI water, that is delivered into the hollow interior of the vessel 110. The DI water can be located remote from the vessel 110 and the DI water is delivered to the first inlet 140 using a conventional conduit 145, such as a tube. A valve is associated with the first inlet 140 for controlling the flow of the DI water into the vessel 110. For example, if the downstream equipment is not calling for DI water, then the valve associated with the first inlet 140 can be closed.

In accordance with the present invention, the vessel 110 also includes a second inlet 150 for selectively delivering carbon dioxide into the hollow interior of the vessel 110. The second inlet 150 can include any number of connectors and/or valve structures to selectively allow for introduction of the carbon dioxide into the hollow interior of the vessel 110. The carbon dioxide can be located remote from the vessel 110 and the carbon dioxide is delivered to the second inlet 150 using a conventional conduit, such as a tube.

The second inlet 150 can include a conduit (tube) 155 that is in fluid communication with the hollow interior of the vessel 110 and extends outward therefrom. The conduit 155 can be located at the bottom 114 of the vessel 110 proximate to the first inlet 140. Thus, both the DI water from the DI water source and the carbon dioxide are introduced to the vessel 110 at the bottom thereof at locations proximate one another.

A valve 160 is associated with the second inlet 150 for controlling the flow of the carbon dioxide into the vessel 110. The valve 160 is thus disposed along the length of the conduit 155 (between the second inlet 150 and the vessel 110). As described herein, the carbon dioxide is selectively delivered into the hollow interior of the vessel 110 for mixing with the DI water. The second inlet 150 is in fluid communication with the bottom end 114 of the vessel 110 to allow the carbon dioxide to enter at the bottom of the vessel 110 and bubble upward toward the top end 112 of the vessel 110. As the bubbles flow upward, the carbon dioxide dissolves into solution and lowers the resistivity of the DI water.

The vessel 110 also includes a first outlet (conduit) 170 that receives the carbonated DI water (with reduced resistivity) from the hollow interior of the vessel 110.

In the illustrated embodiment, the first inlet 140 and the first outlet 170 can be located opposite one another relative to the body of the vessel 110. The first outlet 170 can be in the form of a conduit that can include a connector and/or valve structure. The first outlet 170 thus connects to a conduit (tube) that fluidly connects to the downstream equipment (e.g., a sprayer) that is demanding such carbonated DI water.

At the top end 112 of the vessel 110, a third inlet 120 is formed and provides a fluid conduit into the hollow interior of the vessel 110. The third inlet 120 includes any number of connectors and/or valve structures to selectively allow for introduction of a third fluid into the hollow interior of the vessel 110. For example, the third inlet 120 is configured to receive a gas (a third fluid), such as nitrogen or the like, that is used to pressurize the contents of the vessel 110. The gas source can be located remote from the tank and the gas is delivered to the third inlet 120 using a conventional conduit, such as a tube.

The vessel 110 also has a pressure transducer (generally shown at 121) which is configured to monitor and measure the pressure within the hollow interior of the vessel 110. It will be appreciated that the pressure transducer 121, as well as some of the other components of the device 100, are part of a computer based system. The computer based system includes conventional components, such as a processor (controller) and memory for storing data, etc. The pressure transducer 121 is in communication with the processor and provide a feedback loop such that the processor is programmed such that when the output from the pressure transducer 121 is below set point, the processor instructs the valve associated with the third inlet 120 to open to allow flow of the gas (nitrogen) into the hollow interior of the vessel 110. This results in a pressure increase within the vessel 110. Conversely, when the output from the pressure transducer 121 is above the set point, the processor instructs the valve associated with the third inlet 120 to close to prevent additional gas from flowing into the hollow interior of the vessel 110. Based on the foregoing feedback loop, the pressure within the hollow interior of the vessel 110 is maintained within an acceptable range.

The vessel 110 also includes a mechanism 130 for measuring the level of the contents (e.g., DI water) in the hollow interior of the vessel 110. In the illustrated embodiment, the mechanism 130 is in the form of an external level sensor that is configured to detect the level (fluid level) of the contents (DI water) in the vessel 110. The level sensor 130 can be attached around the outer surface 118 of the vessel 110 using conventional equipment, such as clamps or the like 135.

All of the inlets and the first outlet are formed of non-metal materials. For example, these parts can be formed of plastic or other suitable material. The DI water and carbon dioxide thus flow along flow paths (fluid circuits) that are formed of non-metal materials.

In accordance with the present invention, a mechanism (means) 200 is provided for testing the resistivity of the DI water in the hollow interior of the vessel 110. The mechanism 200 can be in the form of a resistivity sensor which is configured to selectively sample the DI water and measure the resistivity of the DI water (i.e., the carbonated fluid within the vessel 110).

As is known, conductivity is the ability of a solution to conduct electric current. The principle by which instruments measures conductivity is simple—two plates (cells) are placed in the sample, a potential is applied across the plates and the current is measured. Generally, the potential is in the form of a flat 2.5V DC reference voltage. Conductivity (C) is determined from the voltage and current values according to Ohm's Law:

$$C(\text{siemens})=1/R=I(\text{amps})/E(\text{volts})$$

Since the charge on the ions in solution facilitates the conductance of electrical current, the conductivity of a solution is proportional to its ion concentration. The basic unit of measurement for conductivity is Siemens (S). Since cell geometry affects conductivity values, standardized measurements are expressed in specific conductivity units (S/cm) to compensate for variations in electrode dimensions. For most solutions this measurement unit is much too large and either µS/cm or mS/cm is used instead.

The corresponding terms for specific resistivity (R=1/C) are ohm-cm, Kohm-cm and Mohm-cm. Generally users of ultrapure water as well as DI water, as in the present case, prefer to use resistivity units of Mohmcm or Kohm-cm, because measurement in this unit tends to spread the scale out into the range of interest.

The resistivity sensor 200 is in selective communication with the interior of the vessel 110 by a conduit 210 which connects to a dedicated port 211 that is part of the vessel 110 itself. In the illustrated embodiment, the conduit 210 is in fluid communication with the bottom 114 of the vessel 110 and more specifically, is disposed proximate the first outlet 170 such that the DI water that is flowing toward the first outlet 170 to exit the vessel 110 is sampled for monitoring the resistivity value of the DI water. The conduit 210 can be in the form of a tube. "Sampled DI water" thus represents the portion of the DI water that is diverted from the vessel 110 for sampling as opposed to exiting the outlet. The conduits 155 and 210 can be disposed parallel to one another as shown.

A valve mechanism 220 is disposed along the conduit 210 between the vessel 110 and the resistivity sensor 200 to control flow of the sampled DI water from the vessel 110. The valve 220 is a controllable structure that is in communication with the processor of the computer system. The valve 220 can thus be instructed to either open or close depending upon conditions (e.g., whether the downstream equipment is demanding DI water).

In one operating mode, DI water from the vessel 110 is continuously delivered to the resistivity sensor 200 so long as the apparatus 100 is in an operating state meaning that DI water is being delivered to the downstream equipment. The valve 220 thus controls the flow rate of the sampled DI water so as to deliver a set amount of sampled DI water to the resistivity sensor 200 to detect the resistivity value thereof.

FIGS. 2-6 illustrate the construction of one exemplary resistivity sensor 200. The resistivity sensor 200 includes a housing 230 that has a first end 232, a second end 234, a first side 236 and a second side 238. The housing 230 can be formed of plastic or from another suitable material. The first end 232 includes a first fluid connector 240 for attachment to the conduit 210 and the second end 234 includes a second fluid connector 242 for attachment to a conduit (not shown) that leads to a drain. Once the sampled DI water flows through the resistivity sensor and the resistivity value thereof is measured, the sampled DI water simply is delivered to a drain (waste). The resistivity sensor 200 is thus disposed in-line with the conduit 210.

The housing 230 can have a square shape (as shown) or another shape.

Within an opening formed on the first side 236, a first probe 250 is disposed such that the first probe 250 is placed in contact with the sampled DI water flowing from the first end 232 to the second end 234. The first probe 250 (e.g., a stainless steel probe) can be mounted to the housing 230 using a first mounting bracket 255 and a first O-ring 257. Similarly, within an opening formed on the second side 238 which is opposite the first side 236, a second probe 260 is disposed such that the second probe 260 is disposed directly opposite the first probe 250 and is placed in contact with the sampled DI water flowing from the first end 232 to the second end 234 (the sampled DI water thus flows between the two probes 250, 260). The second probe 260 (e.g., a stainless steel probe) can be mounted to the housing 230 using a second mounting bracket 265 and a second O-ring 267.

FIG. 3 shows the resistivity sensor 200 in its assembled state. FIG. 6 is a cross-sectional view showing the locations of the two probes 250, 260 and the central conduit therebetween through which the sampled DI water flows.

The probes 250, 260 of the resistivity sensor 200 thus act as electrodes for measuring the conduction (resistivity) of the sampled DI water. The output (measurements) of the resistivity sensor 200 is delivered to the processor (controller) associated with the device 100. The processor is configured such that when the resistivity of the DI water is below a predetermined threshold (a set point), the flow of carbon dioxide is stopped as by closing the valve associated with the second inlet 150. Similarly, when the resistivity of the DI water exceeds this threshold (the set point), carbon dioxide flows into the vessel as a result of the valve associated with the second inlet 150 being open to deliver carbon dioxide to the vessel 110.

In accordance with the present invention, the device 100 is configured and operated under operating conditions such that the resistivity value of the DI water being introduced into the vessel 110 is controllably reduced to a target level (e.g., resistivity within a target range). In one exemplary embodiment, the device 100 discreetly injects carbon dioxide in 18 MOhm/cm DI water to create 150 KOhm/cm DI water within a tight tolerance (e.g., (150 KOhm/cm+\−50 KOhm/cm)) in an on demand, metals free fashion. The first inlet 140 thus receives 18 MOhm/cm DI water and the first outlet 170 thus discharges 150 KOhm/cm DI water for consumption by the downstream equipment. It will be appreciated that the above values are merely exemplary and not limiting of the present invention. Instead, the present invention teaches a controllable device 100 that reduces the resistivity value of the incoming DI water, that is carbonated by injection of carbon dioxide, to a target resistivity value (or within the tolerance range).

The device 100 thus works in an on demand fashion permitting a smaller vessel and optimized plumbing package to be used and therefore requires less space. There are no exposed metals in the fluid path so the Di water exits the device 100 at reduced resistivity without the unwanted addition of metals to the DI water. In addition, the present invention is directed to a method of employing a small re-ionization vessel, carbon dioxide under introduction, high sensitivity resistivity probe, high speed parameter modeling and improved control algorithm that yields a high capacity of reduced resistivity deionized water in a no added metals fashion.

It is to be understood that the figures and descriptions of the present invention have been simplified to illustrate elements that are relevant for a clear understanding of the present invention, while eliminating, for the purposes of clarity, many other elements which may be found in the present invention. Those of ordinary skill in the pertinent art will recognize that other elements are desirable and/or required in order to implement the present invention. However, because such elements are well known in the art, and because such elements do not facilitate a better understanding of the present invention, a discussion of such elements is not provided herein.

What is claimed is:

1. An apparatus for reducing the resistivity of a first fluid comprising:
 a vessel having a first inlet for receiving the first fluid, an outlet, and a dedicated first port that is separate and spaced from the outlet, wherein the outlet and first port are integral to and protrude outwardly from the vessel at two different locations along the vessel;
 a source of a second fluid that is selectively delivered to the vessel through a second inlet for mixing with the first fluid for reducing the resistivity of the first fluid by forming resistivity-reduced first fluid;
 a resistivity sensor that is in fluid communication with the dedicated first port and measures the resistivity of the resistivity-reduced first fluid;
 wherein the apparatus is constructed such that both the first and second fluids flow along fluid paths defined by metal free materials, whereby the resistivity of the first fluid is reduced without addition of metal ions to the first fluid and the outlet and first port are formed such that the resistivity-reduced first fluid can flow directly from a hollow interior of the vessel into either the outlet or the first port;
 wherein a distance between the dedicated first port and the outlet is less than a distance between the dedicated first port and the first inlet and the outlet and the first port are disposed at a first end of the vessel.

2. The apparatus of claim 1, wherein the first fluid comprises deionized water and the second fluid comprises carbon dioxide.

3. The apparatus of claim 1, wherein the vessel comprises a plastic tank and wherein the vessel has a longitudinal axis along a length of the vessel and a transverse axis along a width of the vessel, wherein a length of the vessel is greater than the width of the vessel.

4. The apparatus of claim 1, further including a pressure transducer for measuring the pressure within the vessel.

5. The apparatus of claim 1, wherein the first inlet includes a plastic conduit through which the first fluid flows, the second inlet include a plastic conduit through which the second fluid flows, and the outlet includes a plastic conduit through which the resistivity-reduced first fluid is discharged from the vessel.

6. The apparatus of claim 1, wherein the resistivity sensor is fluidly connected to the vessel by a conduit that connects to the dedicated first port, which is in direct contact with the vessel, and through which the resistivity-reduced first fluid is sampled from the vessel, the resistivity sensor being configured to measure the resistivity of the resistivity-reduced first fluid.

7. The apparatus of claim 6, wherein the resistivity sensor is operatively coupled to a controller that is also operatively coupled to a valve located along a conduit that defines the second inlet and is in fluid communication with the vessel, the controller being configured to open and close the valve depending upon the output of the resistivity sensor.

8. The apparatus of claim 7, wherein the second fluid comprises carbon dioxide and the first fluid comprises 18 MOhm/cm DI water and the controller is configured to generate 150 KOhm/cm DI water by controlling the addition of the carbon dioxide into the vessel.

9. The apparatus of claim 6, wherein the resistivity sensor is a flow through sensor and is configured to deliver the first fluid to a drain after the resistivity sensor measures the resistivity thereof.

10. The apparatus of claim 7, wherein the conduit includes a valve for controlling a flow rate of the first fluid to the resistivity sensor.

11. The apparatus of claim 1, wherein the vessel includes an external sensor for measuring a liquid level within the vessel.

12. The apparatus of claim 1, wherein the first inlet and the outlet are disposed opposite one another and the second inlet is disposed proximate the first inlet and the resistivity sensor is fluidly connected to the vessel by a conduit such that a flow of the resistivity-reduced first fluid proximate the outlet is diverted to the resistivity sensor, wherein a longitudinal axis of the conduit is perpendicular to an axis passing through the first inlet and the outlet.

13. A method for reducing the resistivity of a first fluid comprising the steps of:
 delivering the first fluid through a first inlet to a vessel, the first inlet being formed at a first end of the vessel;
 selectively delivering a second fluid through a second inlet to the vessel for mixing with the first fluid to cause a reduction in the resistivity of the first fluid by forming resistivity-reduced first fluid, wherein the second inlet is formed at the first end of the vessel;
 measuring the resistivity of the resistivity-reduced first fluid in the vessel by directly withdrawing the resistivity-reduced first fluid through a dedicated first port that is integrally formed in the vessel at the first end of the vessel and protrudes outwardly from the vessel and directly opens into a hollow interior of the vessel and controlling the delivery of the second fluid to the vessel based on measured resistivity values; and
 discharging the resistivity-reduced first fluid from the vessel through an outlet associated therewith when the resistivity value of the resistivity-reduced first fluid is at a predetermined target value or within a predetermined target range, wherein the outlet is integral to and extends outwardly from the vessel at the first end thereof with the dedicated first port and the outlet being formed in a first corner of the first end of the vessel and the first inlet and the second inlet are formed in a second corner of the first end of the vessel;
 wherein the first inlet, second inlet, vessel and outlet are constructed such that fluid paths in which the first and second fluids flow are defined by metal free materials, whereby the resistivity of the first fluid is reduced without addition of metal ions to the first fluid.

14. The method of claim 13, wherein the vessel comprises a plastic tank, the first inlet comprises a plastic conduit and the outlet comprises a plastic conduit.

15. The method of claim 13, wherein the step of measuring the resistivity of the resistivity-reduced first fluid comprises the step of diverting a stream of the resistivity-reduced first fluid from the vessel to a resistivity sensor that is located external to the vessel, while a main stream of the resistivity-reduced first fluid flows through the outlet and is thus maintained separate from the diverted stream.

16. The method of claim 15, wherein the diverted stream of the first fluid flows within a sampling conduit that fluidly connects the vessel to the resistivity sensor, the sampling conduit including a valve for controlling a flow rate of the resistivity-reduced first fluid being delivered to the resistivity sensor.

17. The method of claim 13 wherein the first fluid comprises 18 MOhm/cm DI water and the predetermined target value is 150 KOhm/cm+\−50 KOhm/cm for the discharged first fluid (DI water).

18. The method of claim 13, wherein the second fluid comprises carbon dioxide which is selectively delivered to the vessel for mixing with the first fluid to cause the reduction in the resistivity of the first fluid.

19. The method of claim 13, further including a programmable controller that is operatively coupled to a resistivity sensor that measures the resistivity and a valve that controls the delivery of the second fluid to the vessel.

20. The method of claim 19, wherein the controller and resistivity sensor are part of a feedback loop system which allows the resistivity of the first fluid in the vessel to be controlled.

21. The apparatus of claim 1, wherein the dedicated first port is disposed upstream of the outlet.

22. The apparatus of claim 6, wherein the resistivity sensor is connected in series with the conduit that connects to the dedicated first port, the resistivity sensor having a hollow housing having a first side and an opposing second side, the first side including a first probe and the second side including a second probe with both the first probe and the second probe being in fluid contact with the resistivity-reduced first fluid that flows through the housing.

23. The apparatus of claim 1, wherein a first longitudinal axis passes through a center of the first inlet; a second longitudinal axis passes through a center of the second inlet; a third longitudinal axis passes through a center of a third port and a fourth longitudinal axis passes through a center of the outlet, wherein the first longitudinal axis is perpendicular to the second longitudinal axis, the third longitudinal axis is perpendicular to the fourth longitudinal axis and the second longitudinal axis and the third longitudinal axis are parallel to one another.

24. An apparatus for reducing the resistivity of a first fluid comprising:

a vessel having a first inlet for receiving the first fluid, an outlet, and a dedicated first port that is separate and spaced from the outlet, wherein the outlet and first port are integral to and protrude outwardly from the vessel at two different locations along the vessel, wherein the first port includes a first port conduit that terminates in a drain connector that is configured to mate with a drain conduit;

a valve disposed along the first port for controlling flow within the first port conduit;

a source of a second fluid that is selectively delivered to the vessel through a second inlet for mixing with the first fluid for reducing the resistivity of the first fluid by forming resistivity-reduced first fluid;

a resistivity sensor that is in fluid communication with the first port conduit of the dedicated first port and measures the resistivity of the resistivity-reduced first fluid, the resistivity sensor being disposed along the dedicated first port proximal to the drain connector, the resistivity sensor being disposed between the valve and the drain connector;

wherein a distance between the first port and the outlet is less than a distance between the first port and the first inlet, the first port and the outlet being disposed in one corner of the vessel;

wherein the apparatus is constructed such that both the first and second fluids flow along fluid paths defined by metal free materials, whereby the resistivity of the first fluid is reduced without addition of metal ions to the first fluid and the outlet and first port are formed such that the resistivity-reduced first fluid can flow directly from a hollow interior of the vessel into either the outlet or the first port.

* * * * *